(12) United States Patent
Mieda et al.

(10) Patent No.: US 7,185,549 B2
(45) Date of Patent: Mar. 6, 2007

(54) PRESSURE POINT DETECTOR

(75) Inventors: Fumio Mieda, Tokyo (JP); Haruhiko Motohashi, Tokyo (JP)

(73) Assignee: Korg, Inc., Tokyo (JP)

( * ) Notice: Subject to any disclaimer, the term of this patent is extended or adjusted under 35 U.S.C. 154(b) by 0 days.

(21) Appl. No.: 10/727,842

(22) Filed: Dec. 4, 2003

(65) Prior Publication Data

US 2004/0149051 A1 Aug. 5, 2004

(30) Foreign Application Priority Data

Dec. 13, 2002 (JP) ............... 2002-362165

(51) Int. Cl.
*G01L 1/04* (2006.01)
(52) U.S. Cl. .............. 73/862.473; 73/862.474
(58) Field of Classification Search ................ 73/862.325–862.474
See application file for complete search history.

(56) References Cited

U.S. PATENT DOCUMENTS

| | | | | |
|---|---|---|---|---|
| 3,328,653 A | * | 6/1967 | Wolf, Jr. .................. 73/724 |
| 3,808,480 A | * | 4/1974 | Johnston .................. 73/718 |
| 4,158,217 A | * | 6/1979 | Bell .......................... 73/718 |
| 4,262,532 A | * | 4/1981 | Butler et al. .............. 73/717 |
| 4,763,534 A | * | 8/1988 | Hager ..................... 73/862.68 |
| 5,324,326 A | * | 6/1994 | Lubin ....................... 607/122 |
| 5,515,738 A | * | 5/1996 | Tamori .................. 73/862.46 |

FOREIGN PATENT DOCUMENTS

JP 2000-267663 9/2000

\* cited by examiner

*Primary Examiner*—Max Noori
*Assistant Examiner*—Alandra Ellington
(74) *Attorney, Agent, or Firm*—Muramatsu & Associates

(57) ABSTRACT

A pressure point detector has a simple structure and is capable of detecting which location of a two-dimensional surface such as a circle a pressure is applied can be detected. The pressure point detector includes a flexible insulation member in a predetermined shape, a resistance film formed on one side of the flexible insulation member, a conductive member made of conductive material and established to face the insulation member with a with a predetermined gap therebetween, and a pair of electrodes established on the resistance film in a parallel fashion to produce voltage distribution. The pressure point detector produces an output voltage from the conductive member indicative of a location of the pressure applied to the insulation member.

15 Claims, 5 Drawing Sheets

Fig. 6
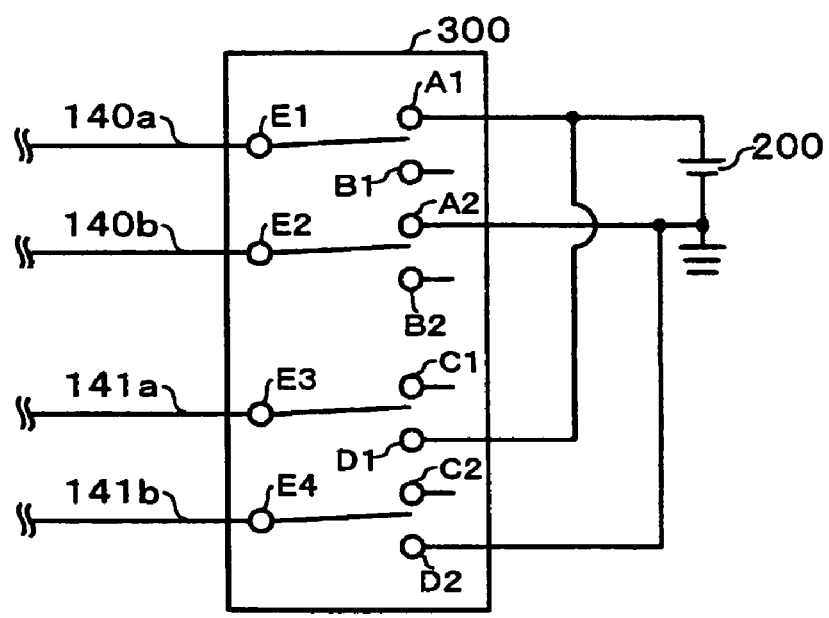
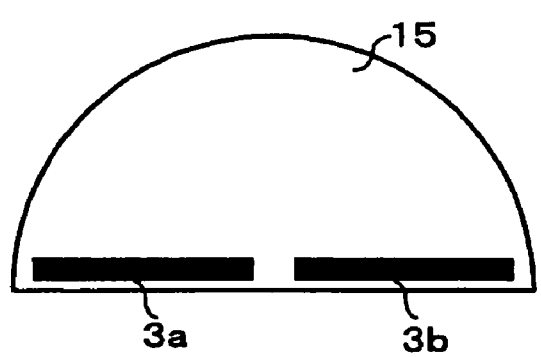
Fig. 7A
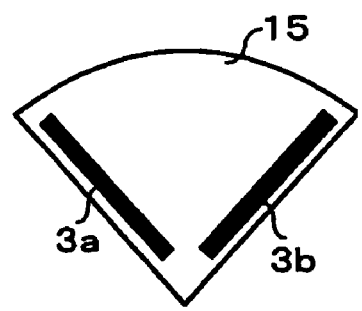
Fig. 7B

PRESSURE POINT DETECTOR

FIELD OF THE INVENTION

This invention relates to a pressure point detector for detecting a location of a point where a pressure is applied to a surface of the detector and generating a signal that indicates the detected location.

BACKGROUND OF THE INVENTION

In a music and audio field, various devices having a point detecting sensor have been proposed to achieve an audio controller with good controllability. For example, a point detecting sensor for producing a DC output voltage corresponding to a location of a pressure point has been proposed by Japanese Patent Laid-Open Publication No. 2000-267663 at pages 3–4 with reference to FIG. 4. When the location of a pressure point is moved in a certain one-dimensional direction (X-direction), such a point detecting sensor produces a DC output voltage indicative of the location of the pressure point, However, according to this conventional point detecting sensor, signals corresponding to the pressure points can be obtained only on a straight line, namely, on a one-dimensional planar surface of the sensor. Hence, when obtaining the pressure point information of polar coordinates (r, θ) on a circular domain, a structure combined with both an X-axis sensor and a Y-axis sensor are required to create a rectangular sensor even when the information on either the center angle θ or the absolute value r is sufficient.

Further, the structure of the conventional point detecting sensor is complicated because it is necessary to conduct a process for polar conversion. In addition, even when the pressure point information of only the circular domain is sufficient, the rectangular sensor having an X-axis sensor and a Y-axis sensor is required to encompass the circular domain. This results in design related limitations because of many useless parts such as the ones in the vertex areas of the rectangular sensor.

SUMMARY OF THE INVENTION

Therefore, the present invention is proposed to solve such problems involved in the conventional technology, and it is an object of the present invention to provide a pressure point detector having a simple structure which is capable of detecting an area on a two dimensional surface such as a circular domain rather than on a straight line on which a pressure is applied.

In order to achieve the above object, the present invention is comprised of a flexible insulation member in a predetermined shape, a resistance film formed on one side of the flexible insulation member, a conductive member positioned to face the insulation member with a predetermined gap there between, and a pair of electrodes established on the resistance film having an insulation area between the electrodes to retrieve an output voltage from the conductive member.

In this pressure point detector, the insulation member and conductive member can be shaped like a disc. Further, the insulation member and conductive member can be formed by other shapes such as a semicircular shape or a triangular shape, etc.

Further, another embodiment of the present invention is comprised of a first flexible insulation member in a predetermined shape, a first resistance film formed on one side of the first insulation member, and a second insulation member in a predetermined shape, a second resistance film formed on one side of the second insulation member, wherein the first resistance film and the second resistance film are placed to face each other with a predetermined gap therebetween, and a first pair of electrodes formed on the first resistance film having a first insulation area therebetween, and a second pair of electrodes formed on the second resistance film having a second insulation therebetween.

In the pressure point detector of the present invention, the first insulation member and the second insulation member are shaped like a disc, and the second pair of electrodes on the second resistance film is comprised of one electrode having a circular shape and formed at about a center of the second resistance film, and another electrode having a ring shape and formed around the outer edge of the second resistance film.

According to the present invention, the pressure point detector of a simple structure is achieved which is capable of detecting which location on a two dimensional surface such as a surface on a disc, rather than on a straight line, a pressure is applied can be achieved.

BRIEF DESCRIPTION OF THE DRAWINGS

FIG. 6 is a circuit diagram showing an electric structure including a switch unit for conducting the point detecting operation in the present invention.

FIGS. 7A–7B are schematic diagrams for explaining an operation of the pressure point detector in the modified versions of the present invention.

DETAILED DESCRIPTION OF THE INVENTION

Figure 1:
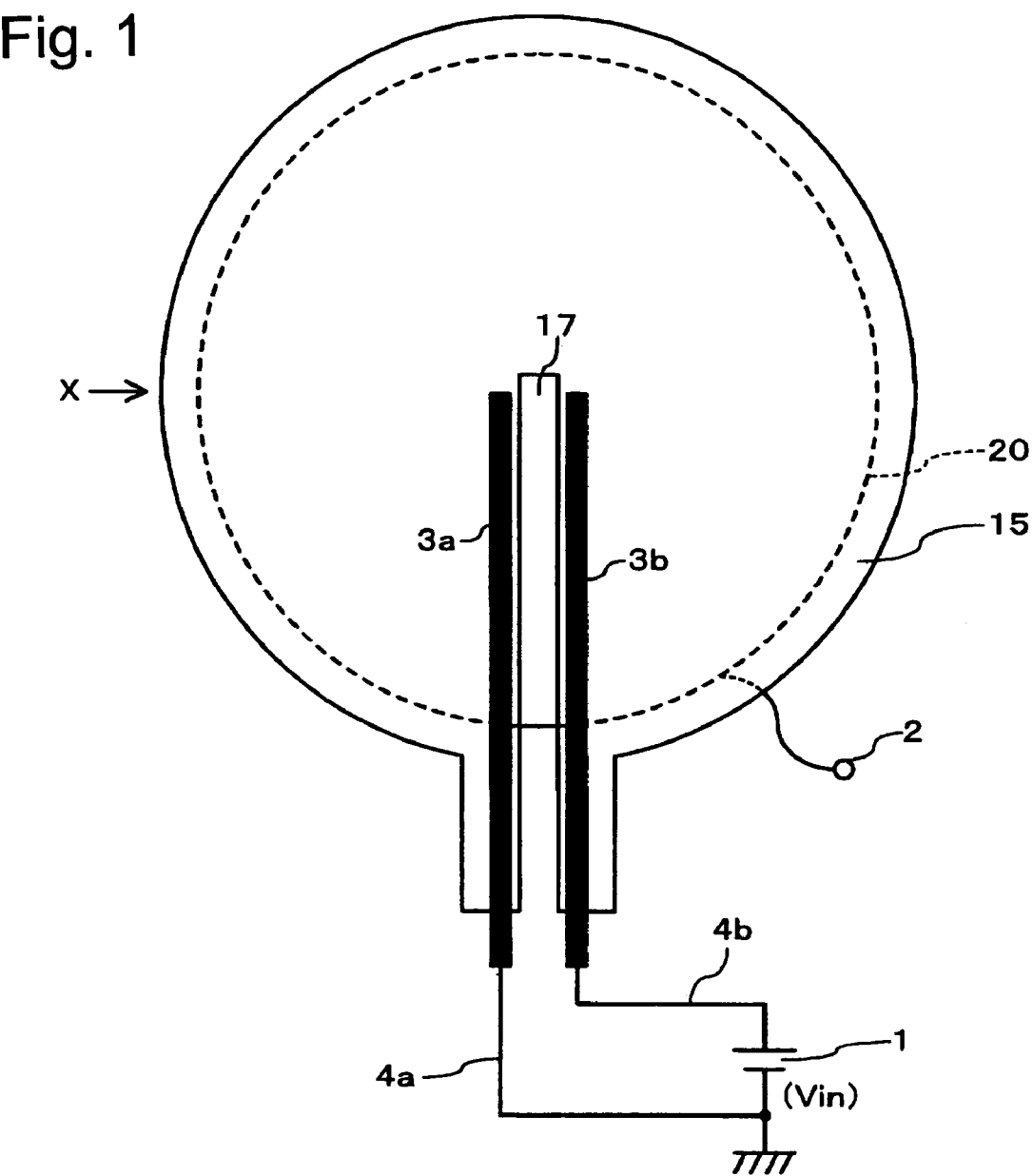
FIG. 1 is a schematic diagram showing a plan view of the pressure point detector in the first embodiment of the present invention.
Figure 2:
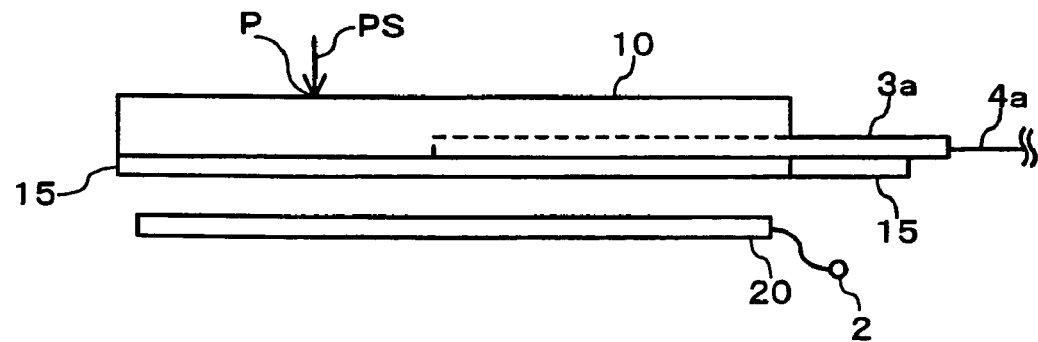
FIG. 2 is a schematic diagram showing a side view of the pressure point detector in the first embodiment of the present invention.

The embodiments of the present invention will be explained below with reference to the accompanying drawings. FIG. 1 is a plan view of the pressure point detector of the first embodiment in accordance with the present invention. It should be noted that an insulation member 10 on the top surface of the pressure point detector is not shown in FIG. 1 for the purpose of simplicity of explanation. FIG. 2 is a side view of the pressure point detector of the present invention seen in the X-direction of FIG. 1.

As seen from FIGS. 1 and 2, the pressure point detector is formed of an insulation member 10 made of insulation material, a resistance film 15 made of material having electric resistance such as carbon which is formed on the entire bottom surface of the insulation member 10, a pair of flat and long shaped electrodes 3a and 3b established in parallel between the resistance film 15 and the insulation member 10, and a conductive member 20 made of conductive material formed on the insulation member 10 with a small distance or a gap from the resistance film 15.

In this example, each of the insulation member 10 and the resistance film 15 has a flat disc shape. Each of the electrodes 3a and 3b is connected with the resistance film 15. A long and flat slit 17 is formed between the electrodes 3a and 3b in an up-down direction of FIG. 1 as an insulation area to secure an insulating state between the two electrodes 3a and 3b. A predetermined voltage (Vin) is supplied to the pressure point detector between the electrode 3a and the electrode 3b from a power source 1 through electric wires 4a and 4b.

The conductive member 20 is a very thin disc-shaped flat layer having a slightly smaller diameter than that of the disc shaped insulation member 10. In order to maintain the gap between the insulation member 10 while allowing the insulation member 10 to be pressed by a user, for example, small and very thin elastic support members (not shown) will be provided between the insulation member 10 and the conductive member 20 at locations not within the area subject to the pressure.

An output terminal 2 for outputting the voltage from the pressure point detector is connected to the conductive member 20. Thus, when a pressure PS is applied to the insulation member 10 as shown in FIG. 2, the part of the resistance film 15 corresponding to the pressure point P comes in contact with the conductive member 20 so that the voltage indicative of the location of the pressure point P is generated from the output terminal 2.

The operation of the pressure point detector of the present invention is explained with reference to FIG. 3. When the voltage Vin from the power source 1 is supplied between the electrodes 3a and 3b where the electrode 3a is connected to the ground, the resistance film 15 forms a predetermined pattern of voltage distribution. In the example of FIGS. 1 and 2, the voltage distribution can be expressed by equipotential lines each being extended in a radial direction from the center of the disc-shaped resistance film 15. In this example, the amount of voltage on the equipotential line is the smallest near the electrode 3a with the ground voltage 0(V) and is the largest near the electrode 3b with the source voltage Vin(V). In other words, in FIG. 3, the electric potential distribution is formed in such a way that the voltages showing the equipotential lines are larger in a clockwise direction.

Figure 3:
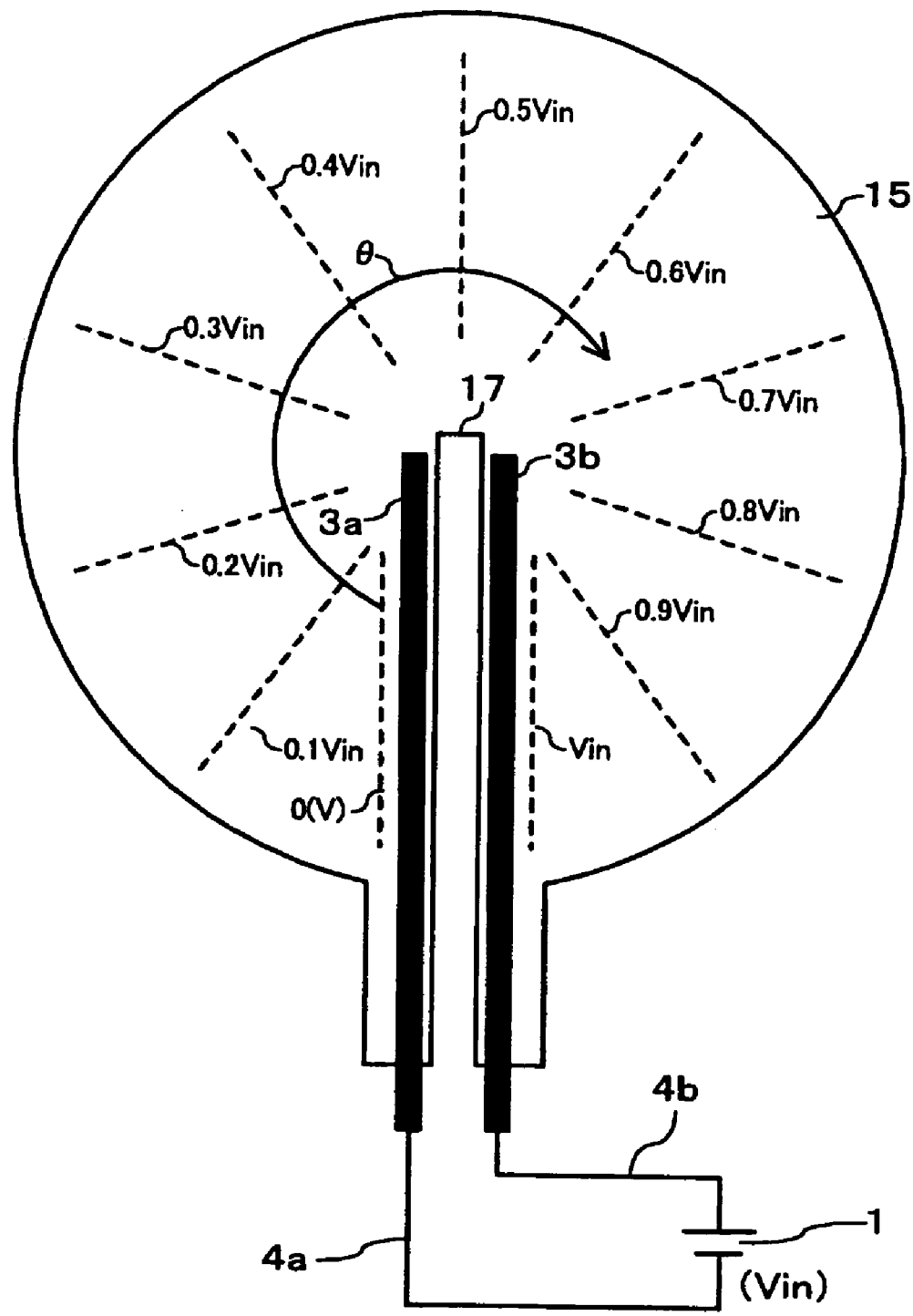
FIG. 3 is a schematic diagram showing voltage distribution for explaining an operation of the pressure point detector of the present invention.

Thus, as shown in FIG. 3, the voltage on the resistance film 15 changes in response to the position on the insulation member 10 in a circular direction θ starting from the position of 0V on the equipotential line. In FIG. 3, the changes from 0V to Vin out of the multiple equipotential lines are listed per 0.1 Vin. Thus, when a certain point on the insulation member 10 is pressed, the voltage on the resistance film 15 corresponding to the pressure point on the insulation member 10 is transmitted to the conductive member 20 and is generated from the output terminal 2. In other words, FIG. 3 shows the relationship between the pressure points on the insulation member 10 and the output voltages representative of the locations of the pressure point.

Hence, the pressure point detector of the present invention is capable of detecting which locations on the two-dimensional surface such as on a curved line of the pressure points rather than on a straight line are pressed. The pressure point detector has a simple structure which includes the flexible disc shaped insulation member 10 on which the resistance film 15 is formed at one side, and the conductive member 20 positioned to face the resistance film 15 on the insulation member 10 with a predetermined gap therebetween. The slit 17 (insulation area) as well as the pair of electrodes 3a and 3b are established in a parallel fashion on the resistance film 15 as noted above so that the output voltage from the conductive material 20 can be obtained through the output terminal 2. Because voltage distribution on the resistance film 15 directly corresponds to the angle of the pressure point, the output voltage from the conductive material 20 indicative of the location of the pressure point can be obtained without using complex calculations or data tables.

In the foregoing description of the pressure point detector of the present invention, the resistance film 15 and the insulation member 10 are in a flat circular shape. However, as shown in FIGS. 7A and 7B, the resistance film 15 and the insulation member 10 can be various other shapes, such as a flat semi-circular shape or a flat fan shape, as well as a flat elliptical shape. Since the equipotential lines are formed radially from the center of the resistance film regardless of the shape of the insulation member and the resistance film, the pressure points on the insulation member can be detected in a circular direction. The present invention can also be applied even if the resistance film 15 is, for example, structured three-dimensionally such as a cone shape or a ball shape.

Since the detection voltage corresponding to the location of the pressure point in the circular direction can be obtained as described above, the pressure point detector of the present invention can be used as a musical performing device for various toys and music instruments. For example, eight sounds of "do-re-mi-fa-so-la-ti-do" are divided into eight areas (locations) on the insulation member 10 so that the corresponding audio sounds can be generated in response to the location which is subject to the pressure operation. This is only one example of many possible applications of the pressure detector of the present invention.

Figure 4:
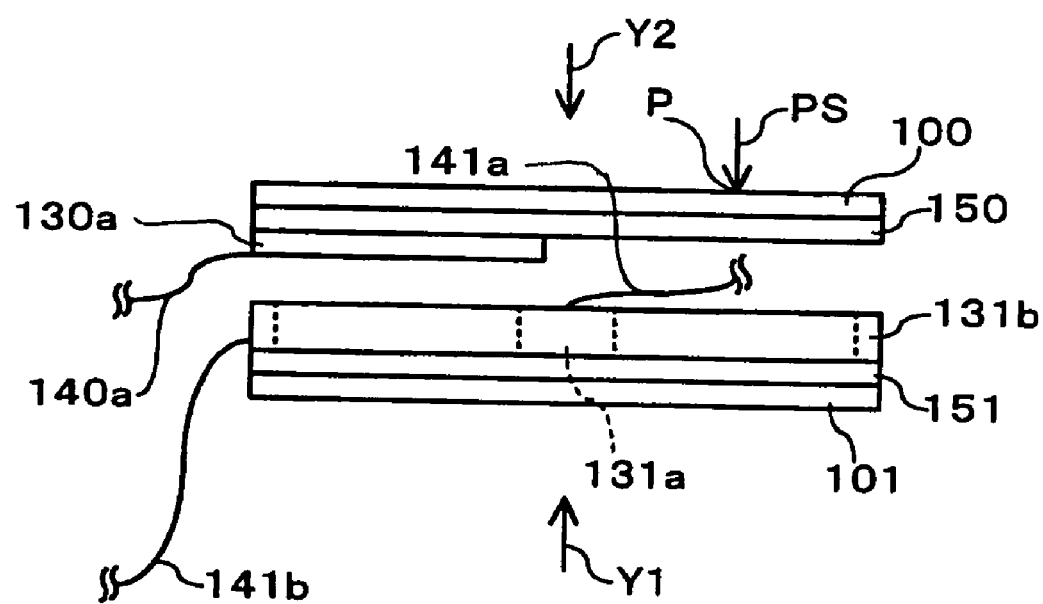
FIG. 4 is a schematic diagram showing a side view of the pressure point detector in the second embodiment of the present invention.
Figure 5A:
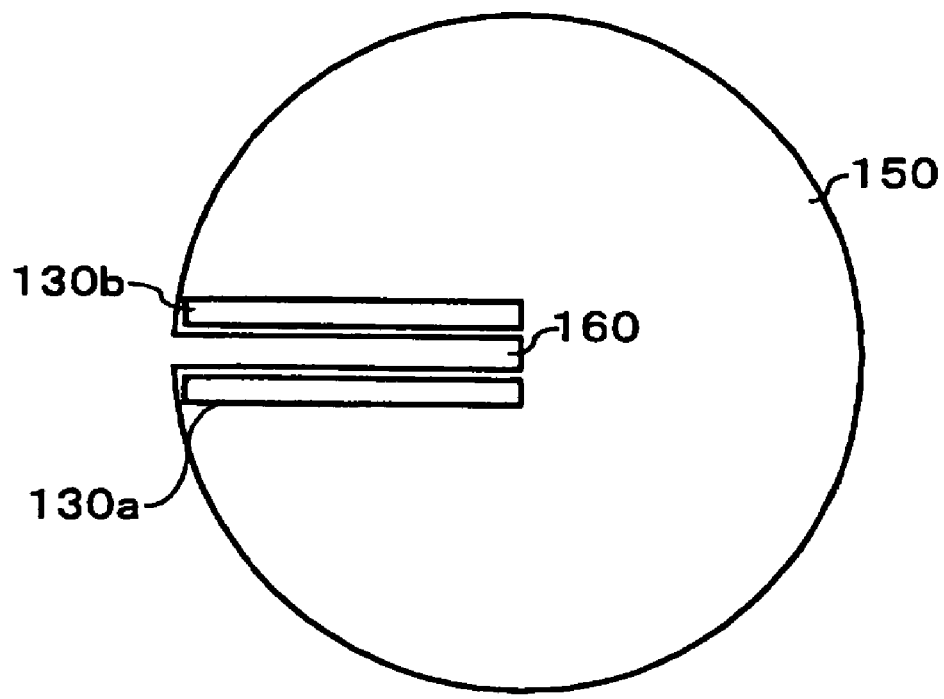
FIGS. 5A–5B are schematic diagrams showing structure of the pressure point detector in the second embodiment seen from a Y1–Y2 direction of FIG. 4.

FIG. 4 is a side view of the second embodiment of the pressure point detector in accordance with the present invention. FIG. 5A is a diagram showing a bottom view of a resistance film 150 of the pressure point detector as seen in the direction of the arrow Y1 in FIG. 4, and FIG. 5B is a diagram showing a top view of a resistance film 151 of the pressure point detector as seen in the direction of the arrow Y2 in FIG. 4.

Figure 5B:
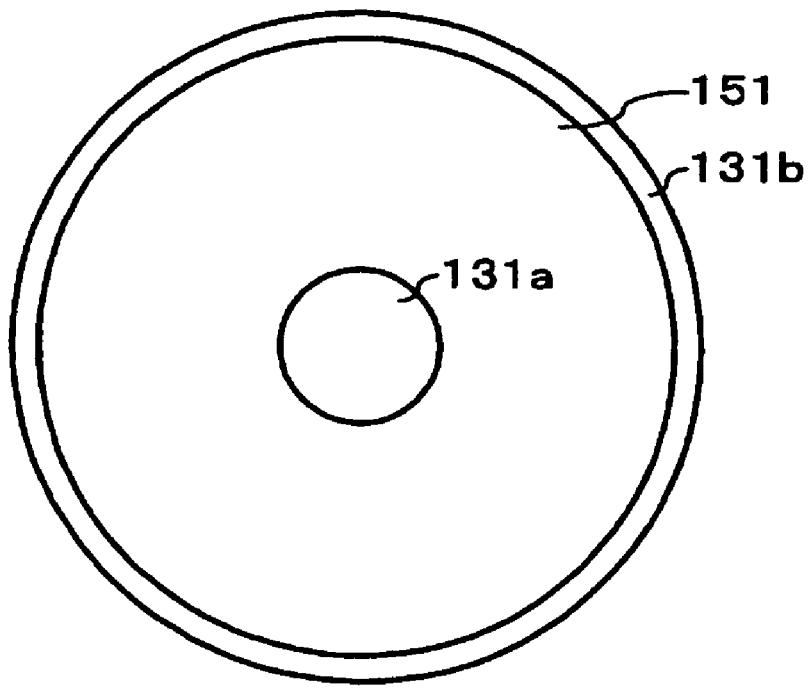

As shown in FIGS. 4 and 5B, the resistance film 151 is formed on a top surface of a thin disc-shaped insulation member 101 made of insulation material. In addition, a flat circle shaped electrode 131a is formed on the surface of the resistance film 151 at the center thereof, and a flat ring-shaped electrode 131b is formed on the surface of the resistance film 151 around an outer edge thereof. In other words, the electrode 131a is a small disc like electrode at the center of the resistance film 151 and the electrode 131b is a large ring like electrode at the edge of the resistance film 151. As shown in FIG. 4, electric wires 141a and 141b are connected to the electrodes 131a and 131b, respectively. It should be noted that the electrical wires 141a and 141b are not shown in the bottom view of FIG. 5B for simplicity of illustration.

As shown in FIGS. 4 and 5A, the resistance film 150 is formed on a bottom surface of a thin disc-shaped insulation member 100 made of insulation material. In addition, a pair of flat line-shaped electrodes 130a and 130b are formed in a parallel fashion on the surface of the resistance film 150 in a right-left direction on the top view of FIG. 5A. The electrodes 130a and 130b are not shown in the side view of FIG. 4 for simplicity of illustration. A long slit 160 is formed between the parallel electrodes 130a and 130b from the center of the resistance film 150 as an insulation area. In FIG. 4, electric wires 140a and 140b are connected to the electrodes 130a and 130b, respectively. It should be noted that the electrical wires 140a and 140b are not shown in the top view of FIG. 5A for simplicity of illustration.

As shown in FIG. 4, the resistance films 150 and 151 are positioned to face each other with a gap therebetween in a manner that the electrodes noted above do not touch the resistance films or other electrodes when no pressure is applied to the pressure point detector. In order to maintain such a gap while allowing the insulation member 100 to be pressed by a user, very thin and small elastic members can be used between the resistance film 150 and the resistance film 151 at locations other than the areas which are used to receive the pressure by the user.

FIG. 6 is a circuit diagram showing an electrical structure of the control system in the pressure point detector of the present invention. A switch unit 300 in the circuit diagram can change the circuit connection between a first mode and a second mode. In the first mode, the switch unit 300 connects terminals E1 and A1, terminals E2 and A2, terminals E3 and C1, and terminals E4 and C2 at the same time. In the second mode, the switch unit 300 connects the terminals E1 and B1, terminals E2 and B2, terminals E3 and D1, and terminals E4 and D2 at the same time.

In the first mode, a voltage Vin from a power source 200 is supplied to the electrodes 130a and 130b through the electric wires 140a and 140b, and the output corresponding to the pressure points in the circular direction on the insulation member 100 can be obtained from the terminals C1 and C2. On the other hand, in the second mode, the voltage Vin from the power source 200 is supplied to the electrodes 131a and 131b through the electric wires 141a and 141b, and the output corresponding to the pressure points in a radial direction (the distance from the center) on the insulation member 101 can be obtained from the terminals B1 and B2.

The operation of the pressure point detector in the second embodiment of the present invention will be explained in the following. First, when the switch unit 300 switches the circuit connection of FIG. 6 to the first mode, the terminals E1 and A1, terminals E2 and A2, terminals E3 and C1, and terminals E4 and C2, respectively, are connected at the same time. As a result, the voltage Vin from the power source 200 is supplied to the electrodes 130a and 130b through the wires 140a and 140b.

Consequently, the electric potential distribution on the resistance film 150 described with reference to FIG. 3 is established, and the voltage on the resistance film 150 corresponding to the pressure points P, namely, the output voltages corresponding to the locations of the pressure point in the circular direction can be obtained. This is because the resistance film 150 and the resistance film 151 become conductive, and the voltage corresponding to the pressure point of the resistance film 150 can be obtained from the terminals C1 and C2.

On the other hand, when the switch unit 300 sets the circuit connection to the second mode, the terminals E1 and B1, terminals E2 and B2, terminals E3 and D1, and terminals E4 and D2, respectively, are connected at the same time. As a result, the voltage Vin from the power source 200 is supplied to the electrodes 131a and 131b through the electric wires 141a and 141b.

Consequently, the equipotential lines on the resistance film 151 are formed in concentric circles, which in this case, has a higher electric potential as it gets closer to the center of the pressure point detector. In other words, the voltage is 0V on the concentric circle close to the electrode 131b and Vin(V) on the concentric circle close to the electrode 131a. Thus, the voltage between electrodes 131a and 131b gradually changes when the position in the radial direction changes.

Therefore, the voltage of the resistance film 151 corresponding to the pressure point P, namely, the output corresponding to the location of the pressure point in the radial direction can be obtained from the terminals B1 and B2. This is because the resistance film 150 and the resistance film 151 become conductive by the pressure, and the voltage corresponding to the pressure point of the resistance film 151 can be obtained from the terminals B1 and B2. When the end of the electrode 131a or 131b is pressed, the electrodes 130a and 130b may be connected with one another through either the electrode 131a or 131b. However, such an unwanted contact between the electrodes can be avoided by incorporating an insulation film (not shown) on the surface of the electrodes, and thus, the electrodes will not electrically contact with one another.

Therefore, according to the second embodiment of the present invention, signals corresponding to the locations of the pressure points in the radial direction or in the circular direction can be obtained by comprising the flexible disc-shaped (or other predetermined shape) insulation member 100 (first insulation member) having the resistance film 150 on one surface thereof, and a disc-shaped (or other predetermined shape) insulation member 101 (second insulation member) having the resistance film 151 on one surface, where both of the resistance films 150 and 151 are positioned to face each other, and where the slit 160 is established as an insulation area between the pair of electrodes 130a and 130b on the resistance film 150, and the pair of electrodes 131a and 131b are established on the resistance film 151 on the insulation member 101.

The embodiments of the present invention have been explained above with respect to the specific structure, however, various changes and modifications can be possible on these embodiments within the basic concept of the present invention. For example, the structure of the switch unit 300 shown in FIG. 6 can be modified depending on a particular configuration of the pressure point detector, and an amplifier can be incorporated to amplify the voltage signals by connecting to the terminals for obtaining amplified signals. Further, in the first embodiment described above, the shape of the conductive member 20 is matched with the shape of the insulation member 10, however, the conductive member 20 can have various other shapes.

Moreover, in the second embodiment, the shape of the resistance film 151 (or insulation member 101) is matched with the shape of the insulation member 100, however, so long as an overall area of one resistance film is covered by an area of the other resistance film, each resistance film (or insulation member) does not have to have the same shape with one another. Also, in FIG. 4, it has been explained that the surface of insulation member 100 is subject to the pressure operation, however, it is also possible that the surface of the insulation member 101 could be subject to the pressure operation as well.

As has been explained above, according to the present invention, the pressure point detector of a simple structure is achieved which is capable of detecting which location on a two dimensional surface such as a surface on a disc, rather than only a straight line, a pressure is applied can be achieved.

What is claimed is:

1. A pressure point detector for detecting a location of a pressure point, comprising:

a flexible insulation member in a predetermined shape;
a resistance film formed on one side of the flexible insulation member;
a conductive member made of conductive material and established to face the insulation member with a predetermined gap therebetween, and
a pair of electrodes established on said resistance film in a parallel fashion to produce voltage distribution, thereby producing an output voltage from said conductive member indicative of a location of the pressure applied to the insulation member;
wherein the resistance film contacts the conductive member at a location corresponding to the point where the pressure is applied, and said pair of electrodes are formed in a radial direction on the resistance film from about a center of the resistance film, thereby differentiating voltages in a circular direction on the resistance film.

2. A pressure point, detector as defined in claim 1, wherein a size of said gap between said resistance film and the conductive member is determined in such a way that, when the pressure is applied to the insulation member, the resistance film contacts the conductive member at a location corresponding to the point where the pressure is applied.

3. A pressure point detector as defined in claim 1, wherein an insulation area is established between the electrodes.

4. A pressure point detector as defined in claim 1, wherein, when a voltage is supplied between the pair of electrodes, said voltage distribution is created by equipotential lines in radial directions from about said center of the resistance film, thereby distributing said different voltages in said circular direction on the resistance film.

5. A pressure point detector as defined in claim 1, wherein, when a voltage is supplied between across the pair of electrodes, said voltage distribution is created by equipotential lines in radial directions from about said center of the resistance film, thereby distributing said different voltages in said circular direction on the resistance film, and wherein an output terminal connected to the conductive member produces said output voltage at the point on a circular direction on the resistance film.

6. A pressure point detector as defined in claim 1, where said insulation member and said conductive member are shaped like a disc.

7. A pressure point detector for detecting a location of a pressure point, comprising:
a first flexible insulation member in a predetermined shape;
a first resistance film formed on one side of the first flexible insulation member;
a second flexible insulation member in a predetermined shape;
a second resistance film formed on one side of the second flexible insulation member, where the first and second resistance films are positioned to face with one another with a predetermined gap therebetween;
a first pair of electrodes established on said first resistance film in a radial direction in a parallel form; and
a second pair of electrodes established on said second resistance film between a center and an outer edge of the second resistance film.

8. A pressure point detector as defined in claim 7, wherein said gap between said first resistance film and said second resistance film is determined in such a way that, when the pressure is applied to either the first insulation member or the second insulation member, the first and second resistance films contact with one another at a location corresponding to the point where the pressure is applied.

9. A pressure point detector as defined in claim 7, wherein said first pair of electrodes are formed in the radial direction in a parallel fashion on the first resistance film from about a center of the first resistance film, and wherein an insulation area is established between the first pair of electrodes.

10. A pressure point detector as defined in claim 7, wherein one of said second pair of electrodes is a flat disc like electrode formed at about the center of the second resistance film and another one of said second pair of electrodes is a ring like electrode formed around the outer edge of the second resistance film.

11. A pressure point detector as defined in claim 7, wherein, when a voltage is supplied between the first pair of electrodes, voltage distribution is created on the first resistance film by radial equipotential lines in radial directions from about a center of the first resistance film, thereby differentiating voltages in a circular direction on the first resistance film.

12. A pressure point detector as defined in claim 7, wherein, when a voltage is supplied between the second pair of electrodes, voltage distribution is created on the second resistance film by concentric equipotential lines in circular directions around a center of the second resistance film, thereby differentiating voltages in a radial direction on the second resistance film.

13. A pressure point detector as defined in claim 7, wherein, when a voltage is supplied between the first pair of electrodes, voltage distribution is created on the first resistance film by radial equipotential lines in radial directions from about a center of the first resistance film, thereby differentiating voltages in a circular direction on the resistance film, and wherein a first output terminal connected to the first conductive member produces a first output voltage at the point on the circular direction on the first resistance film.

14. A pressure point detector as defined in claim 7, wherein, when a voltage is supplied between the second pair of electrodes, voltage distribution is created on the second resistance film by concentric equipotential lines in circular directions around a center of the second resistance film, thereby differentiating voltages in a radial direction on the second resistance film, and wherein a second output terminal connected to the second conductive member produces a second output voltage at the point on the radial direction on the second resistance film.

15. A pressure point detector as defined in claim 7, where said first insulation member and second insulation member are shaped like a disc.

* * * * *